United States Patent [19]

Sakata et al.

[11] Patent Number: 5,047,499
[45] Date of Patent: Sep. 10, 1991

[54] PROCESS FOR THE PRODUCTION OF HIGH MOLECULAR WEIGHT POLYAMIDE-IMIDE RESIN

[75] Inventors: Tōichi Sakata, Katsuta; Kenji Hattori; Yoshiyuki Mukoyama, both of Hitachi, all of Japan

[73] Assignee: Hitachi Chemical Co., Ltd., Tokyo, Japan

[21] Appl. No.: 310,642

[22] Filed: Feb. 15, 1989

[51] Int. Cl.$^5$ .................... C08G 69/08; C08G 69/26; C08G 69/42
[52] U.S. Cl. .................................. 528/313; 528/337; 528/350
[58] Field of Search ........................ 528/350, 313, 337

[56] References Cited

U.S. PATENT DOCUMENTS

| | | | |
|---|---|---|---|
| 2,959,570 | 11/1960 | Kessler et al. | 528/313 |
| 3,860,559 | 1/1975 | Minami et al. | 528/313 |
| 3,917,549 | 11/1975 | Morival et al. | 528/313 |
| 4,118,374 | 10/1978 | Yamazaki et al. | 528/337 |
| 4,420,608 | 12/1983 | Morello | 528/337 |
| 4,645,823 | 2/1987 | Ai et al. | 528/337 |

*Primary Examiner*—John Kight, III
*Assistant Examiner*—P. Hampton-Hightower
*Attorney, Agent, or Firm*—Antonelli, Terry, Stout & Kraus

[57] ABSTRACT

High molecular weight polyamide-imides having a reduced viscosity of 0.3 dl/g or above and exhibiting excellent heat resistance and melt flowability are produced with good economic efficiency by a process, which process comprises the two reaction stages:

(a) a first reaction stage which comprises reacting (I) a trimetallitic acid derivative and (II) an aromatic diamine in the presence of a polar solvent in the presence of a first dehydration catalyst until a polyamide-imide resin having a reduced visciosity of 0.2 to 0.5 dl/g as measured at a concentration of 0.5 g/dl in dimethylformamide at 30° C. is produced; and (b) a second reaction stage which comprises adding a phosphorous triester as a second dehydration catalyst to the reaction mixture resulting from the first reaction stage and further reacting the reaction mixture until a high molecular weight polyamide-imide resin having a reduced viscosity of 0.3 dl/g or above as measured at a concentration of 0.5 g/dl in dimethylformamide at 30° C. is produced.

35 Claims, 1 Drawing Sheet

PROCESS FOR THE PRODUCTION OF HIGH MOLECULAR WEIGHT POLYAMIDE-IMIDE RESIN

BACKGROUND OF THE INVENTION (a) Field of the Invention

The present invention relates to processes for producing polyamide-imide resins and, more particularly, it relates to economical processes for producing high molecular weight polyamide-imide resins exhibiting excellent heat resistance and melt flowability.

(b) Description of the Related Art

As methods of producing polyamide-amides, solution polymerization method with aromatic diisocyanates (see Japanese Patent Application Publication No. 48-19274), precipitation polymerization method with aromatic diisocyanates (see Japanese Patent Application Publication No. 54-44719), a solution polymerization method with pyromellitic acid chlorides (see Japanese Patent Application Publication No. 42-15637), and a solution polymerization method with aromatic diamines (Japanese Patent Application Publication No. 49-4077) are known. In case of a solution polymerization method with aromatic diisocyanates, undesirable side reactions tend to occur from the start of polymerization, causing a difficulty in production of linear polymers having high molecular weight. The polymers produced by the method are therefore too poor in melt flowability to be suitable for the use of molding materials or the like.

Precipitation polymerization method with aromatic diisocyanates has problems in safety in working environment and cost since reaction is carried out using highly poisonous nitro compounds or expensive sulfolane type solvents. Further, the method, due to it's difficulty in controlling molecular weight, has difficulty in quality control of the product. Furthermore, the method tends to induce side reactions like the above-described solution polymerization method with aromatic diisocyanates, and therefore the produced polymers are also inferior in melt flowability. A solution polymerization method with pyromellitic acid chlorides is disadvantageous in cost since it needs a step for purifying the by-produced halogen compounds. Further, in case of producing modified polymers, the method has such a disadvantage as the restriction in materials to be used.

On the other hand, a solution polymerization method with aromatic diamines is free from these problems and is a useful method well-balanced in cost and melt flowability and heat resistance of the product polymers. The method is practically carried out using a dehydration catalyst, for example, phosphoric acid type catalysts such as phosphoric acid and polyphosphoric acid, boric acid type catalysts such as boric acid and boric anhydride, and phosphorous triesters such as triphenyl phosphite. It is known that catalytic effects of these catalysts substantially differ according to the kind thereof.

That is, while a single catalyst system of phosphoric acid, polyphosphoric acid or boric acid can exhibit sufficient catalytic effect with a small amount, it however needs a long time reaction at a high temperature of 200° C. or more. Therefore, even if N-methylpyrrolidone (boiling point: 202° C.), which is a high boiling point solvent, is used as the solvent for synthesis, there will frequently occur undesirable phenomenon that the generating resins having high molecular weight and high viscosity are baked or stuck to the surface of reactor wall in the course of the high temperature and long time synthetic process. While a single catalyst system of phosphorous triesters can achieve high molecular weight polymerization in a reaction at a relatively low temperature of 190° C. or less, it is required in an amount equivalent to the amount of the condensation-reactive groups of the acid component or amine component, and the use of a large quantity of expensive catalyst causes problems of cost and difficulty in controlling molecular weight.

SUMMARY OF THE INVENTION

An object of the present invention is to solve the problems of the conventional methods described above and to provide an economical process for producing high molecular weight polyamide-imide resin having excellent heat resistance and melt flowability.

That is, the present invention provides a process for producing high molecular weight polyamide-imide having a reduced viscosity of 0.3 dl/g or above by reacting (I) a trimellitic acid derivative and (II) an aromatic diamine, in the presence of a polar solvent and a dehydration catalyst, which process comprises the two reaction stages:

(a) a first reaction stage which comprises reacting (I) a trimellitic acid derivative and (II) an aromatic diamine in the presence of a polar solvent in the presence of a first dehydration catalyst until a polyamide-imide resin having a reduced viscosity of 0.2 to 0.5 dl/g as measured at a concentration of 0.5 g/dl in dimethylformamide at 30° C. is produced; and (b) a second reaction stage which comprises adding a phosphorous ester as a second dehydration catalyst to the reaction mixture resulting from the first reaction stage and further reacting the reaction mixture until a high molecular weight polyamide-imide resin having a reduced viscosity of 0.3 dl/g or above as measured at a concentration of 0.5 g/dl in dimethylformamide at 30° C. is produced.

Further, the present invention provides a process for producing high molecular weight polyamide-imide having a reduced viscosity of 0.3 dl/g or above by reacting (I) a trimellitic acid derivative, (II) an aromatic diamine, and one or more compounds (III) selected from the group consisting of (A) dicarboxylic acids and (B) lactams, in the presence of a polar solvent and a dehydration catalyst, which process comprises the two reaction stages:

(a) a first reaction stage which comprises reacting (I) a trimellitic acid derivative, (II) an aromatic diamine, and one or more compounds (III) selected from the group consisting of (A) dicarboxylic acids and (B) lactams, in the presence of a polar solvent in the presence of a first dehydration catalyst until a polyamide-imide resin having a reduced viscosity of 0.2 to 0.5 dl/g as measured at a concentration of 0.5 g/dl in dimethylformamide at 30° C. is produced; and (b) a second reaction stage which comprises adding a phosphorous ester as a second dehydration catalyst to the reaction mixture resulting from the first reaction stage and further reacting the reaction mixture until a high molecular weight polyamide-imide resin having a reduced viscosity of 0.3 dl/g or above as measured at a concentration of 0.5 g/dl in dimethylformamide at 30° C. is produced.

DESCRIPTION OF THE PREFERRED EMBODIMENTS

Figure 1:
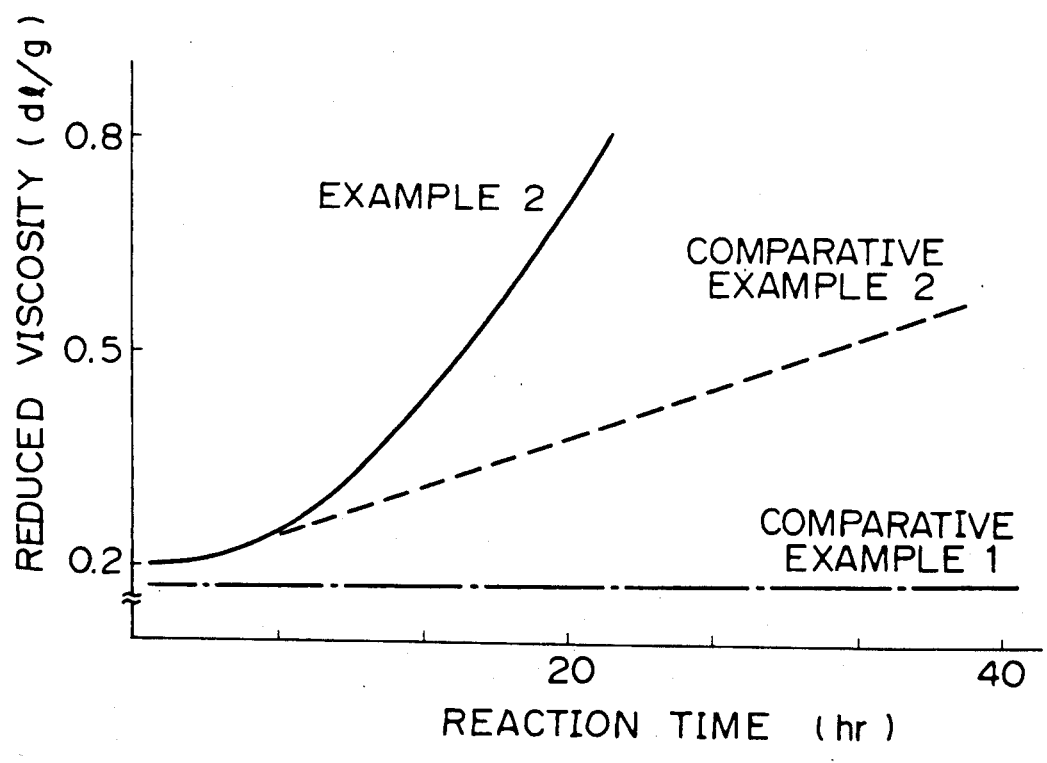
FIG. 1 shows the relationship between reaction time and reduced viscosity in Example 2 and Comparative Examples 1 and 2.

Some illustrative examples of (I) trimellitic acid derivatives to be used in the present invention include trimellitic acid anhydride and esters of trimellitic acid or trimellitic acid anhydride with an alcohol. Typical examples of the esters of trimellitic acid or trimellitic acid anhydride with an alcohol are monomethylesters of trimellitic acid or trimellitic acid anhydride. The preferred trimellitic acid derivative is trimellitic acid anhydride.

Some illustrative examples of (II) aromatic diamines to be used in the present invention include m-phenylenediamine, p-phenylenediamine, 4,4'-diaminodiphenylpropane, 4,4'-diaminodiphenylmethane, 4,4'-diaminodiphenyl sulfide, 4,4'-diaminodiphenyl sulfone, 4,4'-diaminodiphenyl ether, 1,5-diaminonaphthalene, 3,3'-diaminobiphenyl, 3,3'-dimethoxybenzidine, 1,3-diamino-4-isopropylbenzene, xylylenediamine, 4,4''-diaminoterphenyls, 4,4'''-diaminoquarterphenyl, 1,4-bis(p-aminophenoxy)benzene, 4,4'-bis(p-aminophenoxy)diphenyl sulfone, 4,4'-bis(p-aminophenoxy)biphenyl, 2,2-bis[4-(4-aminophenoxy)phenyl]propane, 2,2-bis[4-(4-aminophenoxy)phenyl]hexafluoropropane, 4,4'.-diaminobenzophenone, benzidine-2,3,5,6-tetramethyl-p-phenylenediamine, diaminotoluenes, tetrafluorophenylenediamines, and diaminooctafluorobiphenyls. These compounds may be used individually or as a mixture thereof. In consideration of heat resistance and economical efficiency, the preferred aromatic diamines are 4,4'-diaminodiphenylmethane, 4,4'-diaminodiphenyl ether, p-phenylenediamine, and m-phenylenediamine.

The preferred polar solvents to be used in the present invention are those being capable of easily dissolving the produced polyamide-imide resins and having a boiling point of 180° C. or above. Some illustrative examples of the preferred polar solvents include N-methylpyrrolidone, N-ethylpyrrolidone, N-butylpyrrolidone, phenol, cresols, xylenols, γ-butyrolactone, and sulfolane. Among these, the particularly preferred is N-methylpyrrolidone.

Some illustrative examples of the first dehydration catalysts to be used in the present invention in the first reaction stage include boric acid and boric acid derivatives such as boric anhydride; pentavalent phosphorus compounds, for example, phosphoric acid, pyrophosphoric acid, metaphosphoric acids such as trimetaphosphoric acid, ethylmetaphosphoric acid, polyphosphoric acids such as tetrapolyphosphoric acid, phosphorus pentoxide, and phosphoric pentachloride. The preferred are phosphoric acid, polyphosphoric acids, boric acid, and boric anhydride, and the particularly preferred is phosphoric acid.

The second dehydration catalysts to be used in the present invention in the second reaction stage are phosphorous triesters represented by the formula $(RO)_3P$, wherein R is an aliphatic or aromatic substituent such as methyl, ethyl, isopropyl, butyl, 2-ethylhexyl, isooctyl, decyl, lauryl, phenyl, methylphenyl, ethylphenyl, butylphenyl, octadecylphenyl, nonylphenyl, diphenyl-nonyl, biphenylyl, cyclohexyl, and indenyl; and the preferred is triphenyl phosphite.

In the present invention, (I) trimellitic acid derivative and (II) aromatic diamine are used preferably in an amount equimolar with each other, and the particularly preferable molar ratio, (II)/(I), is from 0.98 to 1.02.

In the present invention, one or more compounds (III) selected from the group consisting of (A) dicarboxylic acids and (B) lactams in addition to the (I) trimellitic acid derivative and (II) aromatic diamine mentioned above may be used as materials at need.

Some illustrative examples of the (A) dicarboxylic acids which may be used in the present invention include succinic acid, adipic acid, sebacic acid, dodecanedicarboxylic acid, isophthalic acid, and terephthalic acid. In consideration of heat resistance and solubility of the product resins, isophthalic acid is preferably used.

In case of using the (A) dicarboxylic acids, it is desirable, in consideration of heat resistance and flowability at the time of molding process, to use (A) as a part of acid component in an amount of 0.05 to 0.50 mol, preferably 0.1 to 0.3 mol per 1 mol of the (II) aromatic diamine.

Some illustrative examples of the (B) lactams which may be used in the present invention include lactams represented by the following general formula:

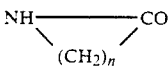

wherein, n is an integer of from 2 to 20, and the preferred is ε-caprolactam.

From the viewpoint of heat resistance and flowability at the time of molding process, it is desirable to use (B) in an amount of 0.05 to 0.50 mol, preferably 0.05 to 0.30 mol per 1 mol of the (II) aromatic diamine.

According to the present invention, acid component and amine component are reacted firstly in the first reaction stage using the first dehydration catalyst until the reduced viscosity of polyamide-imide resin produced reaches 0.2 to 0.5 dl/g, and the reaction is further progressed by adding a phosphorous triester as the second dehydration catalyst to increase the reduced viscosity of the polyamide-imide resin to 0.3 dl/g or above.

If the first reaction stage is concluded before the reduced viscosity reaches 0.2 dl/g, the amount of the second dehydration catalyst required will be approximately equivalent to the amount of acid component or amine component, causing the same problem as that caused by separate use of the second dehydration catalyst. If the reduced viscosity exceeds 0.5 dl/g, partial gelation or runaway reaction will occur at the time of addition of the second dehydration catalyst, causing a difficulty in controlling the molecular weight. The reduced viscosity of the polyamide-imide resin obtained in the second reaction stage should be 0.3 dl/g or above. In consideration of heat resistance, mechanical strength or the like, the preferable reduced viscosity is 0.4 or above.

From the viewpoint of reactivity and facility of purification, it is preferable to use the first dehydration catalyst of the present invention in an amount of 0.5 to 20% by weight on the basis of total of the reaction species including (I) and (II) or (I), (II) and (III). The particularly preferable amount is 1 to 5% by weight.

From the view point of reactivity and facility of reaction control, it is preferable to use the second dehydration catalyst in an amount of 0.1 to 50% by weight on the basis of total of the reaction species including (I) and (II) or (I), (II) and (III). The particularly preferable amount is 3 to 30% by weight.

In the present invention, the total concentration of the reactants of the polymerization system during the first reaction stage using the first dehydration catalyst is preferably about 50 to 60% by weight, and that during the second reaction stage using the second dehydration catalyst is preferably about 30 to 40% by weight. With regard to the reaction temperature, it is desirable to add the first dehydration catalyst at a temperature in the vicinity of 170° C., then carry out polymerization at a temperature in the vicinity of 195° to 205° C., and conduct the addition of the second dehydration catalyst and the reaction in the second reaction stage at a temperature range of about 180° to 190° C.

It is desirable to carry out the first reaction stage and second reaction stage in an atmosphere of an inert gas such as nitrogen.

The polyamide-imide resins obtained by the present invention may be protected with end-group blocking agents at the end of the polymerization reaction. The end-group protection increases the heat stability at the time of molding.

The end-group blocking agents which may be used include, for example, phthalic anhydride, benzoic acid, acetic anhydride, aniline, n-butylamine, and phenyl isocyanate.

The polyamide-imide resins obtained by the present invention may be, if desired, further diluted by adding the above-described polar solvents or low boiling point organic solvents, such as chloroform, tetrahydrofuran, dioxane, toluene, and xylene, to the product solution resulting from the polymerization.

The polyamide-imide resins obtained by the present invention may be used in solution state or powder state and also may be blended with other kinds of polymers, additives, fillers, reinforcing agents, etc., if desired.

The polyamide-imide resins obtained by the present invention, at need, may be improved of their physical properties extremely by heating them (for example, at 200° to 300° C. for 1 to 24 hours) after molding.

According to the present invention, high molecular weight polyamide-imide resins having excellent heat resistance, melt flowability, and economical efficiency can be obtained.

The polyamide-imide resins obtained by the present invention are suitable for the use of thermoplastic molding materials and are also useful as, for example, heat resistant materials for heat resistant paints, heat resistant sheets, heat resistant adhesives, heat resistant laminating materials, heat resistant sliding materials, heat resistant fibers, heat resistant films, and the like.

In order to more fully and clearly illustrate the present invention the following examples are set forth. It is intended that the examples be considered as illustrative rather than limiting the invention as disclosed and claimed herein.

The following examples also illustrate processes falling outside the scope of the instant invention and are presented for comparative purposes only.

EXAMPLES 1 to 5 and COMPARATIVE EXAMPLES 1 to 5

EXAMPLE 1

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| aqueous phosphoric acid solution (content of phosphoric acid: 85%) | 0.02 | 2.3 | 0.5 |
| N-methylpyrrolidone | — | 394 | 100 |
| triphenyl phosphite | 0.13 | 40 | 10 |

Into a four-necked flask equipped with a stirrer, a nitrogen introduction tube, and an apparatus for moisture determination were placed the above components except triphenyl phosphite, and the content was dissolved by raising the temperature slowly to 180° C. with stirring under introduction of nitrogen gas. Subsequently, the resulting solution was further heated to 210° C. and reaction was continued while removing rapidly the distilled water out of the reaction system and at the same time filling up the distilled N-methylpyrrolidone (first reaction stage). The progress of reaction was watched by measuring the increase of molecular weight of the polymer with HPLC (high performance liquid chromatography) to obtain a polyamide-imide resin having a reduced viscosity of 0.3 dl/g as measured at a concentration of 0.5 g/dl in dimethylformamide at 30° C. Subsequently, the resin concentration was diluted to 35% by weight by adding N-methylpyrrolidone and the reaction temperature was lowered to 180° C. Triphenyl phosphite was added in 5 portions over a period of 2 hours and the reaction was continued (second reaction stage). The end point of the reaction was determined by measuring the molecular weight with HPLC. Thus a polyamide-imide resin having a reduced viscosity of 0.65 dl/g was finally obtained. Nothing unusual such as scorching of resin to the inner wall of the flask or gelation was observed.

EXAMPLE 2

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| aqueous phosphoric acid solution (content of phosphoric acid: 85%) | 0.02 | 23.2 | 5 |
| N-methylpyrrolidone | — | 394 | 100 |
| triphenyl phosphite | 0.32 | 98.5 | 25 |

The procedure of Example 1 was repeated with the exception that the above components were used. First, first reaction was carried out to obtain a polyamide-imide resin having a reduced viscosity of 0.45 dl/g. Subsequently, second reaction was carried out to obtain a polyamide-imide resin having a final reduced viscosity of 0.8 dl/g. Nothing unusual such as scorching of resin to the inner wall of the flask or gelation was observed.

EXAMPLE 3

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| aqueous phosphoric acid solution (content of phosphoric acid: 85%) | 0.32 | 37.1 | 8 |
| N-methylpyrrolidone | — | 394 | 100 |

-continued

|  | Mol ratio | g | wt. part |
|---|---|---|---|
| triphenyl phosphite | 0.065 | 2.0 | 0.5 |

The procedure of Example 1 was repeated with the exception that the above components were used. First, first reaction was carried out to obtain a polyamide-imide resin having a reduced viscosity of 0.3 dl/g. Subsequently, second reaction was carried out to obtain finally a polyamide-imide resin having a reduced viscosity of 0.6 dl/g. Nothing unusual such as scorching of resin to the inner wall of the flask or gelation was observed.

EXAMPLE 4

|  | Mol ratio | g | wt. part |
|---|---|---|---|
| trimellitic acid anhydride | 0.90 | 172.8 | 41.7 |
| 4,4'-diaminodiphenylmethane | 1.02 | 202.0 | 48.8 |
| isophthalic acid | 0.10 | 16.6 | 4.0 |
| ε-caprolactam | 0.20 | 22.6 | 5.5 |
| aqueous phosphoric acid solution (content of phosphoric acid: 85%) | 0.21 | 24.3 | 5.9 |
| N-methylpyrrolidone | — | 414 | 100 |
| triphenyl phosphite | 0.33 | 103.5 | 25 |

The procedure of Example 1 was repeated with the exception that the above components were used. First, first reaction was carried out to obtain a polyamide-imide resin having a reduced viscosity of 0.3 dl/g. Subsequently, second reaction was carried out to obtain a polyamide-imide resin having a reduced viscosity of 0.8 dl/g. Nothing unusual such as scorching of resin to the inner wall of the flask or gelation was observed.

EXAMPLE 5

|  | Mol ratio | g | wt. part |
|---|---|---|---|
| trimellitic acid anhydride | 0.85 | 163.2 | 40.6 |
| 4,4'-diaminodiphenylmethane | 1.02 | 202.0 | 50.3 |
| isophthalic acid | 0.15 | 24.9 | 6.2 |
| ε-caprolactam | 0.10 | 11.3 | 2.8 |
| aqueous phosphoric acid solution (content of phosphoric acid: 85%) | 0.024 | 2.4 | 0.6 |
| N-methylpyrrolidone | — | 401.4 | 100 |
| triphenyl phosphite | 0.52 | 160.5 | 40 |

The procedure of Example 1 was repeated with the exception that the above components were used. First, first reaction was carried out to obtain a polyamide-imide resin having a reduced viscosity of 0.45 dl/g. Subsequently, second reaction was carried out to obtain a polyamide-imide resin having a final reduced viscosity of 1.0 dl/g. Nothing unusual such as scorching of resin to the inner wall of the flask or gelation was observed.

COMPARATIVE EXAMPLE 1

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| N-methylpyrrolidone | — | 394 | 100 |

Into the same type four-necked flask as that used in Example 1 were placed the above components and the content was dissolved by raising the temperature slowly to 180° C. with stirring under introduction of nitrogen gas. Subsequently, the resulting solution was further heated to 210° C. and reaction was progressed, while the distilled water was rapidly removed off out of the reaction system and at the same time the distilled N-methylpyrrolidone was filled up (first reaction stage). The progress of reaction was monitered by measuring the increase of molecular weight with HPLC to obtain a polyamide-imide resin having a reduced viscosity of 0.18 dl/g as measured at a concentration of 0.5 g/dl in dimethylformamide at 30° C. The reaction product was a low viscosity liquid.

COMPARATIVE EXAMPLE 2

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| N-methylpyrrolidone | — | 394 | 100 |
| aqueous phosphoric acid solution (content of phosphoric acid: 85%) | 0.60 | 69.5 | 15 |

The procedure of the reaction stage 1 of Example 1 was repeated with the exception that the above components were used, to obtain a polyamide-imide resin having a reduced viscosity of 0.45 dl/g. However, since a high temperature and a long reaction time (210° C. - 25 hours) were required for the reaction, scorching occurred on the bottom of the flask.

COMPARATIVE EXAMPLE 3

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| N-methylpyrrolidone | — | 394 | 100 |
| triphenyl phosphite | 0.76 | 236 | 59.9 |

The procedure of the first reaction stage of Example 1 was repeated with the exception that the above components were used, to obtain a polyamide-imide resin having a reduced viscosity of 0.18 dl/g. Subsequently, the resin concentration was decreased to 35% by weight by adding N-methylpyrrolidone, and the reaction temperature was lowered to 180° to 190° C. While the reaction was progressed by adding triphenyl phosphite in 5 portions over a period of 2 hours, the viscosity of varnish was rapidly increased and gelatinized.

COMPARATIVE EXAMPLE 4

|  | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| N-methylpyrrolidone | — | 394 | 100 |
| aqueous phosphoric acid solution (content of phosphoric acid: 85%) | 0.02 | 0.23 | 0.06 |
| triphenyl phosphite | 0.76 | 236 | 60 |

The procedure of Example 1 was repeated with the exception that the above components were used. First, first reaction stage was carried out to obtain a polyamide-imide having a reduced viscosity of 0.18 dl/g. Subsequently, triphenyl phosphite was added and reaction was progressed for about 30 minutes (second reaction stage). The reduced viscosity of vanish was increased and the varnish was gelatinized at the end.

COMPARATIVE EXAMPLE 5

| | Mol ratio | g | wt. part |
|---|---|---|---|
| trimellitic acid anhydride | 1.00 | 192 | 48.7 |
| 4,4'-diaminodiphenylmethane | 1.02 | 202 | 51.3 |
| N-methylpyrrolidone | — | 394 | 100 |
| aqueous phosphoric acid solution (content of phosphoric acid: 85%) | 0.60 | 69.5 | 15 |
| triphenyl phosphite | 0.0064 | 1.97 | 0.05 |

The procedure of Example 1 was repeated with the exception that the above components were used. First, first reaction stage was carried out to obtain a polyamide-imide resin having a reduced viscosity of 0.35 dl/g.

Subsequently, the second stage polymerization was attempted. However, polymerization to a high molecular weight polyamide-imide failed to proceed under the reaction conditions, resulting in a solution with a final reduced viscosity of 0.38 dl/g.

Films were produced from the polyamide-imide resins obtained in Examples 1 to 5 and Comparative Examples 1 to 5 and glass transition temperature was measured with a thermomechanical analyzer. The results and the appearance of reaction in the course of synthesis were shown in Table 1.

TABLE 1

| | Examples | | | | | Comparative examples | | | | |
|---|---|---|---|---|---|---|---|---|---|---|
| | No. 1 | No. 2 | No. 3 | No. 4 | No. 5 | No. 1 | No. 2 | No. 3 | No. 4 | No. 5 |
| Proportion of raw material | | | | | | | | | | |
| 4,4'-diaminodiphenylmethane (mol) | 1.02 | 1.02 | 1.02 | 1.02 | 1.02 | 1.02 | 1.02 | 1.02 | 1.02 | 1.02 |
| trimellitic acid anhydride (mol) | 1.00 | 1.00 | 1.00 | 0.9 | 0.85 | 1.00 | 1.00 | 1.00 | 1.00 | 1.00 |
| isophthalic anhydride (mol) | — | — | — | 0.1 | 0.15 | — | — | — | — | — |
| ε-caprolactam (mol) | — | — | — | 0.2 | 0.10 | — | — | — | — | — |
| phosphoric acid (wt. %)* | 0.5 | 5 | 8 | 5 | 0.5 | 0 | 15 | — | 0.05 | 15 |
| triphenyl phosphite (wt. %)* | 10 | 25 | 0.5 | 25 | 40 | — | — | 60 | 60 | 0.05 |
| Reduced viscosity (dl/g) | | | | | | | | | | |
| End point of the first reaction stage | 0.3 | 0.45 | 0.3 | 0.3 | 0.4 | — | — | 0.18 | 0.18 | 0.35 |
| Final product | 0.65 | 0.8 | 0.6 | 0.8 | 1.0 | 0.18 | 0.45 | — | — | 0.38 |
| Reaction time (hr.) | 18 | 20 | 15 | 23 | 25 | 35 | 25 | 30 | 30 | 30 |
| Reaction state | ○ | ○ | ○ | ○ | ○ | low viscosity | X | gelation | gelation | ○ |
| Glass transition temperature (°C.) | 235 | 238 | 235 | 223 | 245 | 190 | 228 | — | — | 220 |

*wt. % based on the total of the reaction species

The relationships between reaction time and reduced viscosity in Example 2 and Comparative Examples 1 and 2 are shown in FIG. 1.

The reaction appearance shown in the Table 1 was judged by examining the occurrence of scorching on the flask's wall or generation of gelatinized matter. ○ represents absence, and x represents presence.

The measurement of glass transition temperatures (Tg) of films were conducted using a thermomechanical analyzer of Perkin Elmer TMS-1.

Measuring conditions tension method
temperature raising rate: 10° C./min, load: 5 g, sample: 2 mm width, spun: 10 mm

Production of film 25 wt. % varnish was applied over a clean glass plate with an applicator to a thickness of 80 μm and was then heated for 30 minutes with a 250° C. hot air dryer to obtain a film of about 20 μm thickness.

What is claimed is:

1. A process for producing high molecular weight polyamide-imide resin having a reduced viscosity of 0.3 dl/g or above by reacting (I) a trimellitic acid derivative selected from the group consisting of trimellitic acid anhydride and an ester of trimellitic acid or trimellitic acid anhydride with an alcohol and (II) an aromatic diamine, in the presence of a polar solvent and dehydration catalyst, which process comprises the two reaction stages:
   (a) a first reaction stage which comprises reacting the trimellitic acid derivative (I) and the aromatic diamine (II) in the presence of a polar solvent in the presence of a first dehydration catalyst selected from the group consisting of boric acid, boric anhydride, phosphoric acid, pyrophosphoric acids, metaphosphoric acids, ethylmethaphosphoric acid, polyphosphoric acid, phosphorus pentoxide, and phosphoric pentachloride at a temperature ranging from about 195° C. to about 205° C. until a polyamide-imide resin having a reduced viscosity of 0.2 to 0.5 dl/g as measured at a concentration of 0.5 g/dl in dimethylformamide at 30° C. is produced; and
   (b) a second reaction stage which comprises adding a phosphorous triester as a second dehydration catalyst to the reaction mixture resulting from the first reaction stage and further reacting the reaction mixture at a temperature ranging from about 180° C. to about 190° C. until a high molecular weight polyamide-imide resin having a reduced viscosity of 0.3 dl/g or above as measured at a concentration of 0.5 g/dl in dimethylformamide at 30° C. is produced; the first dehydration catalyst being used in an amount of 0.5 to 20% by weight on the basis of the total of the trimellitic acid derivative (I) and the aromatic diamine (II), and the phosphorus triester as a second dehydration catalyst being used in an amount of 0.1 to 50% by weight on the basis of the total of the trimellitic acid derivative (I) and the aromatic diamine (II).

2. The process of claim 1, wherein the first dehydration catalyst is selected from the group consisting of phosphoric acid, polyphosphoric acids, boric acid, and boric anhydride.

3. The process of claim 2, wherein the first dehydration catalyst is phosphoric acid.

4. The process of claim 1, wherein the phosphorous triester as a second dehydration catalyst is selected from the compounds having the structure represented by the following general formula:

$$(RO)_3P$$

wherein
R is selected from the group consisting of methyl, ethyl, isopropyl, butyl, 2-ethylhexyl, isooctyl, decyl, lauryl, phenyl, methylphenyl, ethylphenyl, butylphenyl, octadecylphenyl, nonylphenyl, diphenylnonyl, biphenylyl, cyclohexyl, and indenyl.

5. The process of claim 4, wherein the phosphorous triester as a second dehydration catalyst is triphenyl phosphite.

6. The process of claim 1, wherein the first dehydration catalyst is used in an amount of 1 to 5% by weight on the basis of the total of the trimellitic acid derivative (I) and the aromatic diamine (II), and the phosphorous triester as a second dehydration catalyst is used in an amount of 3 to 30% by weight on the basis of the total of the trimellitic acid derivative (I) and the aromatic diamine (II).

7. The process of claim 1, wherein the (I) trimellitic acid derivative is trimellitic acid anhydride.

8. The process of claim 1, wherein the (II) aromatic diamine is selected from the group consisting of 4,4'-diaminodiphenylmethane, 4,4'-diaminodiphenyl ether, p-phenylenediamine, and m-phenylenediamine.

9. The process of claim 8, wherein the (II) aromatic diamine is 4,4'-diaminodiphenylmethane.

10. The process of claim 1, wherein the polar solvent is selected from the group consisting of N-methylpyrrolidone, N-ethylpyrrolidone, N-butylpyrrolidone, phenol, cresols, xylenols, γ-butyrolactone, and sulfolane.

11. The process of claim 10, wherein the polar solvent is N-methylpyrrolidone.

12. A process for producing high molecular weight polyamide-imide resin having a reduced viscosity of 0.3 dl/g or above by reacting (I) a trimellitic acid derivative selected from the group consisting of trimellitic acid anhydride and an ester of trimellitic acid or trimellitic acid anhydride with an alcohol, (II) an aromatic diamine, and one or more compounds (III) selected from the group consisting of (A) dicarboxylic acids and (B) lactams, in the presence of a polar solvent and dehydration catalyst, which process comprises the two reaction stages:

(a) a first reaction stage which comprises reacting the trimellitic acid derivative (I) and the aromatic diamine (II), and one or more compounds (III) selected from the group consisting of (A) dicarboxylic acids and (B) lactams, in the presence of a polar solvent in the presence of a first dehydration catalyst selected from the group consisting of boric acid, boric anhydride, phosphoric acid, pyrophosphoric acids, metaphosphoric acids, ethylmethaphosphoric acid, polyphosphoric acid, phosphorus pentoxide, and phosphoric pentachloride at a temperature ranging from about 195° C. to about 205° C. until a polyamide-imide resin having a reduced viscosity of 0.2 to 0.5 dl/g as measured at a concentration of 0.5 g/dl in dimethylformamide at 30° C. is produced; and (b) a second reaction stage which comprises adding a phosphorous triester as a second dehydration catalyst to the reaction mixture resulting from the first reaction stage and further reacting the reaction mixture at a temperature ranging from about 180° C. to about 190° C. until a high molecular weight polyamide-imide resin having a reduced viscosity of 0.3 dl/g or above as measured at a concentration of 0.5 g/dl in dimethylformamide at 30° C. is produced; the first dehydration catalyst being used in an amount of 0.5 to 20% by weight on the basis of the total of the trimellitic acid derivative (I) and the aromatic diamine (II), and the one or more compounds (III) and the phosphorus triester as a second dehydration catalyst being used in an amount of 0.1 to 50% by weight on the basis of the total of the trimellitic acid derivative (I) the aromatic diamine (II) and the one or more compounds (III).

13. The process of claim 12, wherein the first dehydration catalyst is selected from the group consisting of phosphoric acid, polyphosphoric acids, boric acid, and boric anhydride.

14. The process of claim 13, wherein the first dehydration catalyst is phosphoric acid.

15. The process of claim 12, wherein the phosphorous triester as a second dehydration catalyst is selected from the compounds having the structure represented by the following general formula:

$$(RO)_3P$$

wherein
R is selected from the group consisting of methyl, ethyl, isopropyl, butyl, 2-ethylhexyl, isooctyl, decyl, lauryl, phenyl, methylphenyl, ethylphenyl, butylphenyl, octadecylphenyl, nonylphenyl, diphenylnonyl, biphenylyl, cyclohexyl, and indenyl.

16. The process of claim 15, wherein the phosphorous triester as a second dehydration catalyst is triphenyl phosphite.

17. The process of claim 12, wherein the first dehydration catalyst is used in an amount of 1 to 5% by weight on the basis of total of the trimellitic acid derivative (I), the aromatic diamine (II) and one or more compounds (III) and the phosphorus triester as a second dehydration catalyst is used in an amount of 3 to 30% by weight on the basis of the total of the trimellitic acid derivative (I), the aromatic diamine (II), and one or more compounds (III).

18. The process of claim 12, wherein the (I) trimellitic acid derivative is trimellitic acid anhydride.

19. The process of claim 12, wherein the (II) aromatic diamine is selected from the group consisting of 4,4'-diaminodiphenylmethane, 4,4'-diaminodiphenyl ether, p-phenylenediamine, and m-phenylenediamine.

20. The process of claim 19, wherein the (II) aromatic diamine is 4,4'-diaminodiphenylmethane.

21. The process of claim 12, wherein the (A) dicarboxylic acids are succinic acid, adipic acid, sebacic acid, dodecanecarboxylic acid, isophthalic acid, and terephthalic acid.

22. The process of claim 12, wherein one or more of the (A) dicarboxylic acids are used in an amount of 0.05 to 0.50 mol per 1 mol of the (II) aromatic diamine.

23. The process of claim 22, wherein one or more of the (A) dicarboxylic acids are used in an amount of 0.1 to 0.3 mol per 1 mol of the (II) aromatic diamine.

24. The process of claim 12, wherein the (B) lactams are compounds represented by the following general formula:

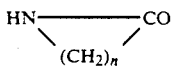

wherein n is an integer of 2 to 20.

25. The process of claim 12, wherein one or more of the (B) lactams are used in an amount of 0.05 to 0.50 mol per 1 mol of the (II) aromatic diamine.

26. The process of claim 25, wherein one or more of the (B) lactams are used in an amount of 0.05 to 0.30 mol per 1 mol of the (II) aromatic diamine.

27. The process of claim 12, wherein the compound (III) is isophthalic acid.

28. The process of claim 12, wherein the compound (III) is ε-caprolactam.

29. The process of claim 12, wherein the compounds (III) are isophthalic acid and ε-caprolactam.

30. The process of claim 12, wherein the polar solvent is selected from the group consisting of N-methylpyrrolidone, N-ethylpyrrolidone, N-butylpyrrolidone, phenol, cresols, xylenols, γ-butyrolactone, and sulfolane.

31. The process of claim 30, wherein the polar solvent is N-methylpyrrolidone.

32. The process of claim 1, wherein the first reaction stage and the second reaction stage are carried out in an atmosphere of an inert gas.

33. The process according to claim 32, wherein the inert gas is nitrogen.

34. The process according to claim 12, wherein the first reaction stage and the second reaction stage are carried out in an atmosphere of an inert gas.

35. The process according to claim 34, wherein the inert gas is nitrogen.

* * * * *